United States Patent [19]

Koiwai et al.

[11] Patent Number: 4,995,581
[45] Date of Patent: Feb. 26, 1991

[54] INSIDE REARVIEW MIRROR ASSEMBLY FOR MOTOR VEHICLE

[75] Inventors: Hideo Koiwai, Saitama; Junichi Yamazaki, Chiba; Kunio Yoshino; Masaharu Tsuruoka, both of Saitama, all of Japan

[73] Assignee: Kabushiki Kaisha Matsuyama Seisakusho, Tokyo, Japan

[21] Appl. No.: 278,800

[22] Filed: Dec. 2, 1988

[30] Foreign Application Priority Data

Dec. 4, 1987 [JP] Japan .................. 62-185240
Jun. 7, 1988 [JP] Japan .................. 63-75483
Jun. 7, 1988 [JP] Japan .................. 63-75484

[51] Int. Cl.$^5$ ............................................ A47G 1/24
[52] U.S. Cl. .................................. 248/480; 248/549; 248/900
[58] Field of Search ............ 248/480, 481, 482, 475.1, 248/479, 549, 900; 350/636

[56] References Cited

U.S. PATENT DOCUMENTS

| 4,012,022 | 3/1977 | Tomita ........................ 248/481 X |
| 4,066,235 | 1/1978 | Hashiguchi .................. 248/549 X |
| 4,436,273 | 3/1984 | Yuda et al. .................. 248/549 |
| 4,436,371 | 3/1984 | Wood et al. ................. 350/278 X |
| 4,468,059 | 5/1987 | Ohyama ...................... 248/481 X |
| 4,645,316 | 2/1987 | Ohyama ...................... 248/481 X |
| 4,778,265 | 10/1988 | Fingerle et al. ............ 248/459 X |
| 4,836,491 | 6/1989 | Fimeri ....................... 248/481 X |

FOREIGN PATENT DOCUMENTS

| 5585339 | 12/1980 | Japan . |
| 1211222 | 11/1970 | United Kingdom ......... 248/549 |
| 1219173 | 1/1971 | United Kingdom ......... 248/549 |

Primary Examiner—Ramon O. Ramirez
Attorney, Agent, or Firm—Rosen, Dainow & Jacobs

[57] ABSTRACT

An inside rearview mirror assembly for use in the passenger compartment of a motor vehicle includes a base, a stay detachably mounted on the base, and a mirror unit supported on the stay. The base and the stay have respective joint surfaces intimately contacting each other, partly spherical interfitting projections and dimples formed respectively on front ends of the joint surfaces, and non-contact surfaces disposed forwardly of the projections and dimples and providing a gap between the stay and the base. When the mirror unit is subjected to an impact, the stay is angularly moved forwardly about the projections and dimples, and detached from the base.

10 Claims, 3 Drawing Sheets

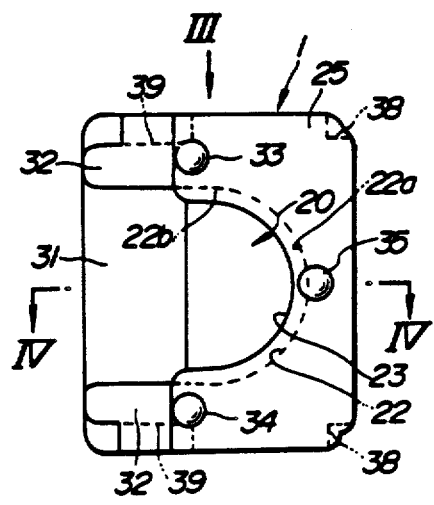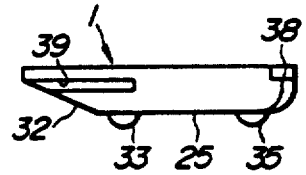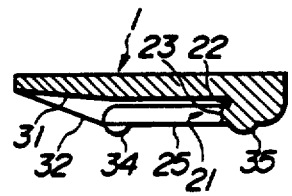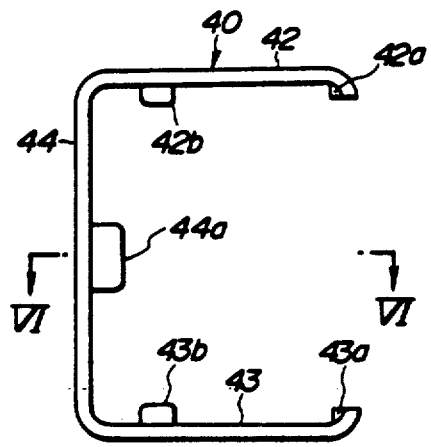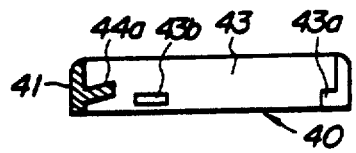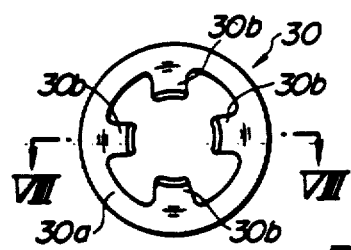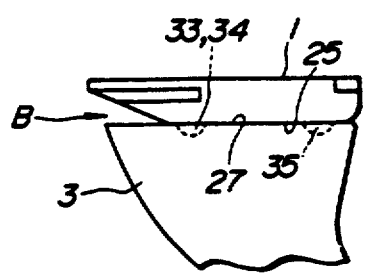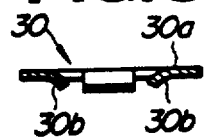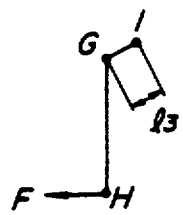

INSIDE REARVIEW MIRROR ASSEMBLY FOR MOTOR VEHICLE

BACKGROUND OF THE INVENTION

1. Field of the Invention

The present invention relates to an inside rearview mirror assembly for use in the passenger compartment or cabin of a motor vehicle, and more particularly to an attachment structure for such an inside rearview mirror assembly.

2. Description of the Relevant Art

Generally, an inside rearview mirror assembly mounted in the passenger compartment of a motor vehicle such as an automobile includes a base fixed to a vehicle body portion such as the upper end of a windshield or the front end of a compartment roof, and a stay connected to the base and holding a mirror.

When the motor vehicle collides with another motor vehicle or some other object, the head of the driver of the motor vehicle tends to hit the inside rearview mirror assembly. To protect the driver's head in such an accident, the inside rearview mirror assembly of such a structure is required to allow the stay to come off the base when abnormal external forces are imposed on the stay.

One such a collapsible inside rearview mirror assembly is disclosed in Japanese Laid-Open Utility Model Publication No. 55-85339, for example. The disclosed inside rearview mirror assembly includes a resilient member comprising a leaf spring attached to a stay and held in engagement with a base, thus assembling the stay and the base together. When the stay is subjected to abnormal external forces applied, the stay is forced to slide with respect to the base, permitting the resilient member to be separated from the base and hence the stay to drop off.

When the stay drops off the base, the stay slides with respect to the base against a relative frictional force therebetween. Since such a frictional force is determined dependent on a plurality of factors such as the surface roughness of each of the contact surfaces of the stay and the base, the area of contact between the stay and the base, and the like. Therefore, it is difficult to stabilize the load or force required to cause the stay to come off the base.

SUMMARY OF THE INVENTION

According to the present invention, there is provided an inside rearview mirror assembly for use in the passenger compartment of a motor vehicle, comprising: a base adapted to be mounted in the passenger compartment and attached to a body of the motor vehicle; a mirror; a stay supporting the mirror; and holder means holding the stay detachably with respect to the base, the base and the stay having respective joint surfaces intimately contacting each other, partly spherical interfitting projection and dimple formed respectively on front ends of the joint surfaces with respect to a longitudinal direction of the motor vehicle, and non-contact surfaces disposed forwardly of the projection and dimple with respect to the longitudinal direction and providing a gap between the stay and the base, whereby the stay is angularly movable forwardly about the projection and dimple.

When an external impact force is applied to the stay, the interfitting projection and dimple on the joint surfaces of the base and the stay prevent the stay from sliding with respect to the base, but the stay is caused to turn about the projection and dimple until the stay comes off the base. The stay can therefore disengage from the base without the need to resist any frictional forces which would otherwise be developed between the stay and the base. The load required to force the stay off the base is thus easily stabilized.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 2 is a plan view of a base of the inside rear-view mirror assembly;

FIG. 3 is a side elevational view of the base as viewed in the direction of the arrow III in FIG. 2;

FIG. 4 is a cross-sectional view taken along line IV—IV of FIG. 2;

FIG. 5 is a plan view of o cover of the inside rearview mirror assembly;

FIG. 6 is a cross-sectional view taken along line VI—VI Of FIG. 5;

FIG. 7 is a plan view of a bolt holder of the inside rearview mirror assembly;

FIG. 8 is a cross-sectional view taken along line VIII—VIII of FIG. 7;

FIG. 9 is a fragmentary view showing the manner in which the base is joined to a stay;

FIG. 13 is a schematic diagram showing the positional relationship between a projection, a bolt head, and a point of application of a force;

DETAILED DESCRIPTION OF THE PREFERRED EMBODIMENTS

Figure 1:
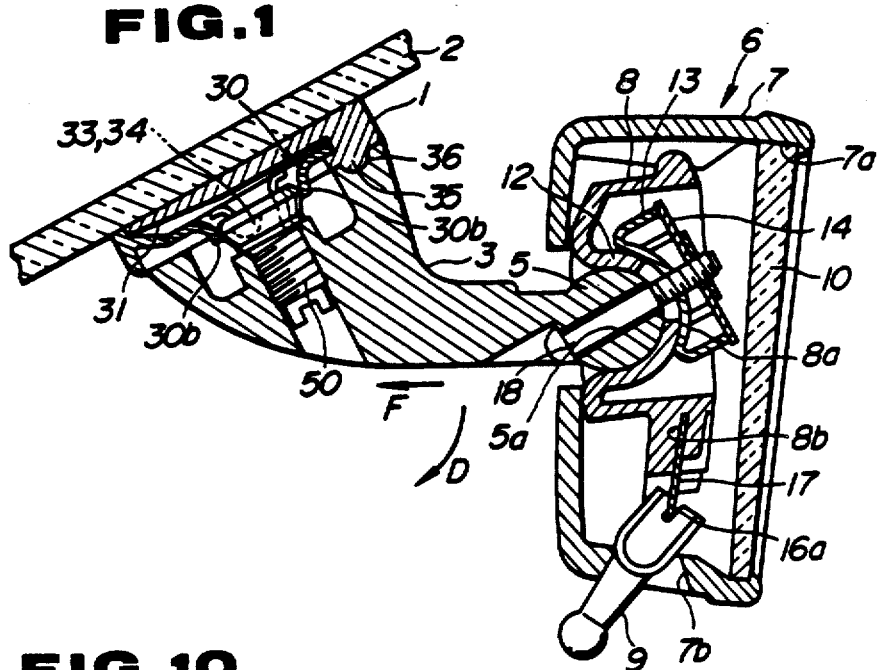
FIG. 1 is a vertical cross-sectional view of an inside rearview mirror assembly according to the present invention.

As shown in FIG. 1, an inside rearview mirror assembly for use in the passenger compartment of a motor vehicle such as an automobile generally comprises a base 1 fixed to the inner surface of an automobile front windshield 2, a stay 3 joined to the base 1 and having a spherical member 5 on its distal end, and a mirror unit 6 tiltably supported on the spherical member 5.

The mirror unit 6 comprises a mirror housing 7, a bracket 8, an operating knob 9, and a mirror 10. The mirror 10 is fitted in an opening 7a in the mirror housing 7. The bracket 8 is positioned in the mirror housing 7 and has an upper end engaging the inner surface of an upper wall of the mirror housing 7. The bracket 8 also has a spherical holder 12 in which the spherical member 5 of the stay 3 is snugly received. A spring plate 14 is disposed on one side of the spherical holder 12 remotely from the spherical member 5 with a support 13 interposed between the spring plate 14 and the spherical holder 12. The spherical member 5 has a diametrical hole 5a defined therethrough, and the bracket 8 has a hole 8a defined therein. A screw 18 extends through the holes 5a, 8a and is threaded into the spring plate 14. The bracket 8 is pressed against the spherical member 5 by tightening the screw 18.

The mirror housing 7 has a opening 7b defined in a lower wall thereof. The operating knob 9 is swingably mounted in the opening 7b for swinging movement about an intermediate portion of the operating knob 9. The operating knob 9 has a groove 16a defined in its upper end and in which the lower end of a spring 17 is received. The upper end of the spring 17 is inserted in a slot 8b defined in a lower portion of the bracket 8. By swinging the operating knob 9, the mirror 10 mounted in the mirror housing 7 is angularly displaced to reduce or increase light coming from behind the motor vehicle and reflected to the driver. Thus, the inside rearview mirror assembly serves as an antiglare rearview mirror assembly. Since the screw 18 is inserted through the hole 5a in the spherical member 5 and threaded into the spring plate 14, the spring plate 14 can easily be adjusted in its resiliency by turning the screw 18 even after the stay 3 and the mirror unit 6 have been assembled.

As shown in FIGS. 2 and 3, the base 1 is of a rectangular shape as viewed in plan and includes a flat lower surface 25 serving as a joint surface for being joined to the stay 3. The base 1 has a central recess 20 of a substantially semicircular shape defined therein by a wall 21 having a peripheral groove 22 and a semicircular inward flange 23 (FIG. 4). The base 1 also has a first slanted surface 31 positioned forwardly of the recess 20 in the longitudinal direction of the motor vehicle, and a pair of second slanted surfaces 32 disposed one on each side of the first slanted surface 31 and contiguous to the joint surface 25, the second slanted surfaces (non-contact surfaces) 32 being held out of contact with the stay 3. The joint surface 25 of the base 1 has three partly spherical projections 33, 34, 35 engaging in respective dimples 36 defined in a joint surface 27 of the stay 3. The projections 34, 35 are positioned on the front end of the joint surface 25. The second slanted surfaces 32 are located near and forwardly of the projections 33, 34, respectively, leaving a gap B (FIG. 9) between the base 1 and the stay 3 forwardly of the projections 33, 34.

The peripheral groove 22 comprises a receiving portion 22a substantially complementary in shape to an outer periphery of a bolt holder 30 (described later), and a guiding portion 22b for guiding the bolt holder 30 into the receiving portion 22a. The bolt holder 30 is retained in position with more than half of its outer periphery engaging in the peripheral groove 22.

As shown in FIG. 2, the base 1 has a pair of engaging recesses 38 defined in respective rear corners thereof, and another pair of engaging recesses 39 defined in respective lateral sides thereof.

FIG. 5 shows a cover 40 having a substantially C shape as viewed in plan. The cover 40 has a base portion 44, and two parallel spaced legs 42 extending from the opposite ends of the base portion 44. The legs 42 have inwardly extending fingers 42a, 43a respectively on their distal ends, and inwardly projecting ledges 42b, 43b respectively on their inner surfaces near the proximal ends thereof. The base portion 44 has an inwardly directed ledge 44a (see also FIG. 6) on the inner surface of an intermediate portion thereof.

The cover 40 is attached to the base 1 with the ledges 42b, 43b engaging respectively in the recesses 39 of the base 1 and also with the fingers 42a, 43a locked respectively in the recesses 38 of the base 1. The ledge 44a presses the bolt holder 30 to force the bolt holder 30 into reliable fitting engagement in the peripheral groove 22. Stated otherwise, when the fingers 42a, 43a are locked in the recesses 38, then it can be confirmed that the bolt holder 30 is reliably fitted in the peripheral groove 22.

The bolt holder 30 is made of a resilient leaf spring material. As illustrated in FIGS. 7 and 8, the bolt holder 30 comprises an annular body 30a and a plurality of engaging teeth 30b projecting inwardly and upwardly from the annular body 30a. As shown in FIG. 1, the engaging teeth 30b push the head of a bolt 50 threaded in the stay 3 to hold the bolt 50 in position, thus attaching the stay 3 to the base 1.

The procedure of attaching the stay 3 to the base 1 will be described below.

Figure 10:
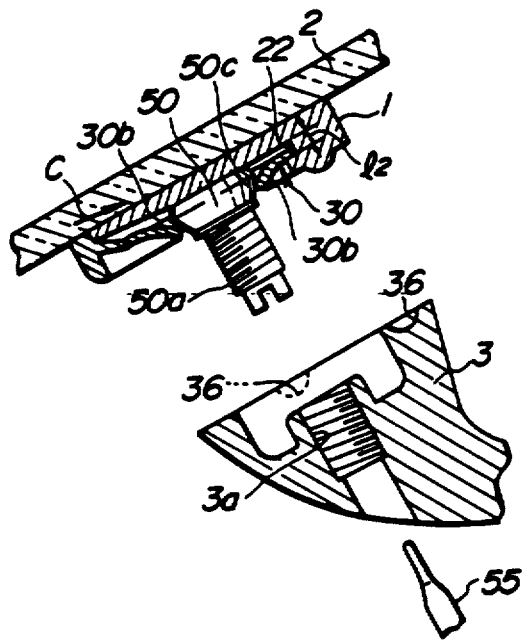
FIG. 10 is a cross-sectional view illustrating the manner in which the stay is installed on the base.
Figure 12:
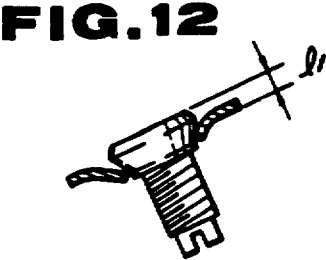
FIG. 12 is a cross-sectional view showing the manner in which a bolt is temporarily held by the bolt holder.

As shown in FIG. 12, the bolt 50 is inserted through the bolt holder 30, and the bolt holder 30 is moved on and along the first slanted surface 31 of the base 1 in the direction of the arrow C in FIG. 10 until the outer periphery of the bolt holder 30 is fitted in the peripheral groove 22. Then, the cover 40 is attached to the base 1 in the manner described above, and the externally threaded shank 50a of the bolt 50 and an internally threaded hole 3a defined in the stay 3 are brought into registry with each other. The bolt 50 is then turned about its own axis by a screwdriver 55 to cause the stay 3 to be threaded over the bolt 50, thereby attaching the stay 3 to the base 1.

If the bolt 50 were not securely positioned with respect to the stay 3, it would be difficult to cause the stay 3 to be threaded over the bolt 50. According to the embodiment, the gap, indicated at 11 in FIG. 12, between the bolt holder 30 and the upper surface of the head of the bolt 50 is selected in advance to be larger than the width l2 (FIG. 10) of the peripheral groove 22. When the bolt holder 30 is fitted in the peripheral groove 22 while resiliently flexing the peripheral edge of the bolt holder 30, the hood of the bolt 50 is pressed against the base 1 under the resiliency of the bolt holder 30. Therefore, when the bolt holder 30 is retained in position in the base 1, the bolt 50 is prevented from wobbling.

Since l1>l2, the bolt holder 30 may not quickly be fitted into the peripheral groove 22 because of the resiliency of the bolt holder 30. However, the bolt holder 30 can relatively easily be fitted into the peripheral groove 22 by being moved gradually along the first slanted surface 31 into the peripheral groove 22.

Operation of the inside rearview mirror assembly thus constructed will be described below.

Figure 11:
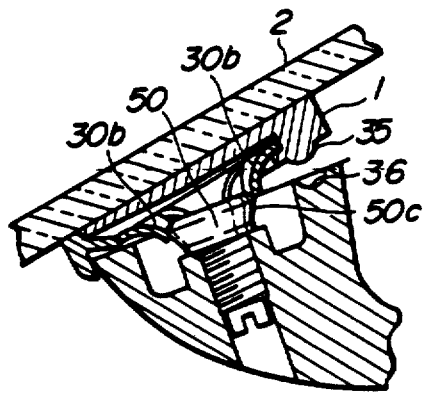
FIG. 11 is a cross-sectional view showing the manner in which the stay come off the base.

When a force F is applied to the stay 3 due to an impact imposed on the mirror housing 7 in FIG. 1, the stay 3 tends to slide with respect to the base 1 under the force F. Since the projections 33, 34., 35 engage respectively in the dimples 36, however, the stay 3 is angularly displaced about the projections 33, 34 in the direction of the arrow D in FIG. 1. At this time, the gap B (FIG. 9) present between the joint surfaces 25, 27 forwardly of the projections 33, 34 allows the stay 3 to be turned about the projections 33, 34 in the direction of the arrow D. The dimple 36 in the stay 3 is displaced away from the projection 35 of the base 1, and a rear side 50c of the head of the bolt 50 disengages from a corresponding one of the teeth 30b of the bolt holder 30, as shown in FIG. 11, whereupon the stay 3 comes off the base 1.

Inasmuch as the stay 3 is separated from the base 1 without sliding with respect to the base 1, no friction occurs between the base 1 and the stay 3, and hence no frictional force plays a role in determining the load or force required to separate the stay 3 from the base 1. Consequently, the load required to force the stay 3 off the base 1 is stabilized.

In the illustrated embodiment, the rear side 50c of the bolt head and the corresponding engaging tooth 30b engage each other at a position which is slightly rearward of the projections 33, 34 for the following reason: FIG. 13 shows a point of application H of the force F to the stay 3, a point G indicating the position of the projections 33, 34, and a point I indicating the position where the rear side 50c of the bolt head engages the corresponding engaging tooth 30b (i.e., where the bolt head first disengages from the bolt holder 30 when the force is applied to the stay 3). Assuming that the point of application H and the force F remain unchanged, the smaller the distance 13 between the points G, I, the greater the leverage, allowing the stay 3 to disengage from the base 1 with a small force.

The stay 3 is separated from the base 1 in the manner described above when external forces are applied to the mirror housing 7 from behind the inside rearview mirror assembly. When external forces are imposed on the mirror housing 7 in other directions, the dimples 36 are also forced to disengage from the projections 35, and the bolt 50 is separated from the bolt holder 30, thereby permitting the stay 3 to come off the base 1.

According to the aforesaid assembling procedure, the bolt holder 30 with the bolt 50 inserted is attached to the base 1, and then the stay 3 is threaded over the bolt 50 supported on the base 1. For a higher degree of efficiency, however, it is preferable to first thread the bolt 50 inserted in the bolt holder 30 into the stay 3 and then attach the bolt holder 30 to the base 1. A modified inside rearview mirror assembly suitable for such a assembling process will be described below with reference to FIGS. 14 and 15.

Figure 14:
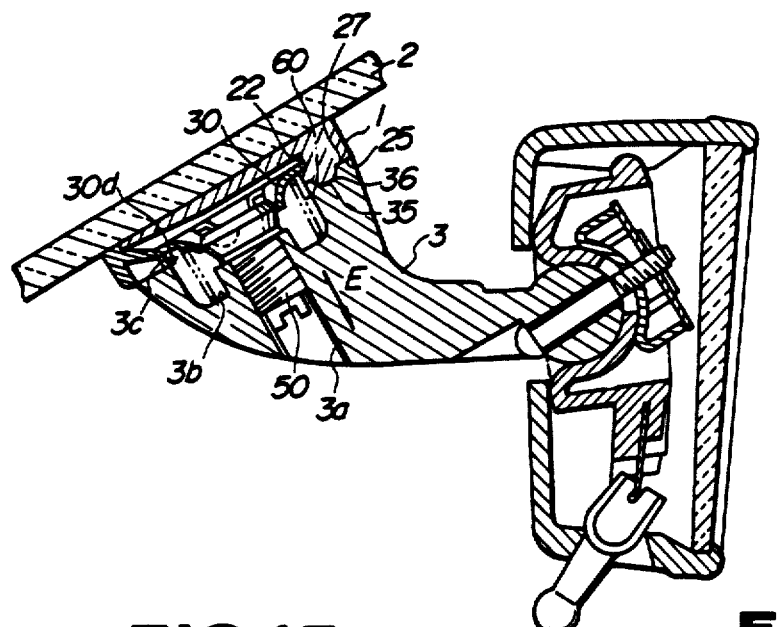
FIG. 14 is a vertical cross-sectional view of a modified inside rearview mirror assembly.
Figure 15:
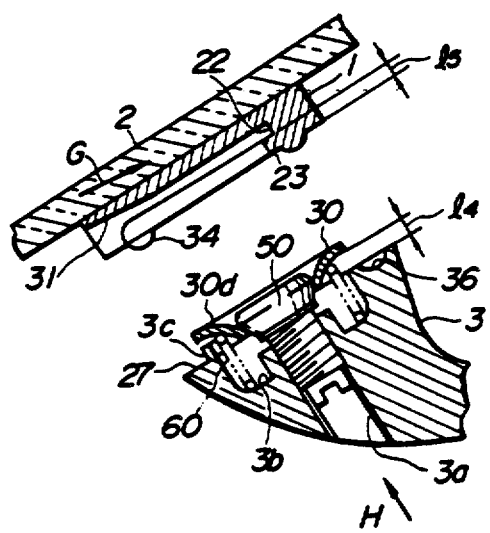
FIG. 15 is a fragmentary cross-sectional view showing the manner in which a stay of the modified inside rearview mirror assembly is installed on a base.

Those components shown in FIGS. 14 and 15 which are identical to those of the previous embodiment are denoted by identical reference numerals, and will not be described in detail.

The stay 3 has an annular recess 3b defined in the joint surface 27 thereof in surrounding relation to the threaded hole 3a, and a protrusion 3c for supporting the bolt holder 30, the protrusion 3c being disposed on the joint surface 27 at an edge of the recess 3a. A spacer 60 in the form of a coil spring is disposed between the bolt holder 30 and the bottom of the recess 3b.

The base 1 and the stay 3 are assembled together in the following manner:

As shown in FIG. 12, the bolt 50 is inserted in the bolt holder 30 as described above, and then, as shown in FIG. 15, the bolt 50 is threaded into the hole 3a in the stay 3 with the spacer 60 interposed between the bolt holder 30 and the bottom of the recess 3b. The distance 14 between the bolt holder 30 and the joint surface 27 is maintained at a certain level by the spacer 60, which is larger than the thickness 15 of the inward flange 23 of the peripheral wall 21 of the base 1. The bolt holder 30 is normally urged resiliently away from the stay 3 by the spacer 60 against wobbling movement with respect to the bolt 50.

Then, the bolt holder 30 is moved on and along the the arrow G in FIG. 15 until the outer periphery of the flange 23 is fitted between bolt holder 30 and the joint surface 27 of groove the stay 3. Thereafter, the cover 40 is attached to the base 1 in the manner described above, and the bolt 50 is tightened slightly in the direction of the arrow E in FIG. 14 by a screwdriver which has been inserted into the hole 3a in the direction of the arrow H in FIG. 15. The stay 3 is thus securely attached to the base 1.

The supporting protrusion 3c has a height such that when the bolt holder 30 is inserted in the peripheral groove 22 in the base 1, a small gap is left between the upper end of the protrusion 3c and the lower surface of the bolt holder 30, and when the bolt 50 is turned so as to be tightened in the direction of the arrow E, the upper end of the protrusion 3c is held against the lower surface of the bolt holder 30.

In the modified arrangement shown in FIGS. 14 and 15, since the distance 14 between the bolt holder 30 and the joint surface 27 is larger than the thickness 15 of the inward flange 23, the bolt holder 30 can be fitted into the peripheral groove 22 without the flange 23 being caught by the bolt holder 30. Accordingly, the inside rearview mirror assembly can be assembled with ease. When the bolt 50 is displaced in the direction of the arrow E upon being tightened, a front side 30d of the bolt holder 30 (opposite to the portion thereof engaging in the peripheral groove 22) is supported on the protrusion 3c on the joint surface 27 against undesirable deformation. Therefore, the setting load on the bolt 50 can be of a constant value upon assembly. The inside rearview mirror assembly can thus be assembled with ease.

Figure 16:
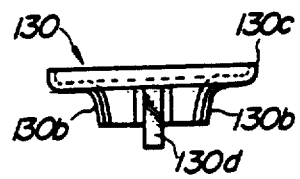
FIG. 16 is a side elevational view of a modified bolt holder.
Figure 17:
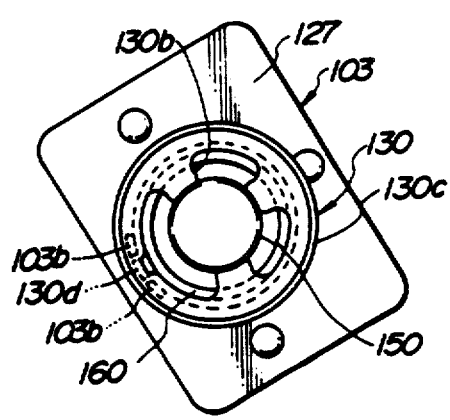
FIG. 17 is a plan view of the joint surface of a stay on which the bolt holder of FIG. 16 is temporarily held in place.

FIG. 16 shows a modified bolt holder 130. The bolt holder 130 has an outer peripheral edge raised into a stiffening rib 130c for preventing the bolt holder 130 from being flexed as much as possible when the bolt holder 130 is attached to the base. The bolt holder 130 also has a plurality of engaging teeth 130b for engaging a bolt 150 (FIG. 17), and a leg 130d for positioning the bolt holder 130 when it is temporarily held on a stay 103 (FIG. 17). As illustrated in FIG. 17, a pair of support protrusions 103b is disposed on a joint surface 127 of the stay 103 for supporting the lower surface of the bolt holder 130 when the stay 103 is installed on the base. The leg 130d is fitted between the protrusions 103b for positioning the bolt holder 130 with respect to the stay 103. With the bolt holder 130 mounted on the stay 103, a spacer 160 is interposed between the bolt holder 130 and the joint surface 127 of the stay 103.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

We claim:

1. An inside rearview mirror assembly for use in the passenger compartment of a motor vehicle, comprising:
   a base adapted to be mounted in the passenger compartment and attached to a body of the motor vehicle;

a mirror;

a stay supporting said mirror;

holder means holding said stay detachably with respect to said base; and said base and said stay having respective joint surfaces intimately contacting each other, partly spherical interfitting projection and dimple formed respectively on front ends of said joint surfaces with respect to a longitudinal direction of the motor vehicle, and non-contact surfaces disposed forwardly of said projection and dimple with respect to said longitudinal direction and providing a gap between said stay and said base.

2. An inside rearview mirror assembly according to claim 1, wherein said holder means is positionally related to said projection and dimple such that when said stay is angularly moved about said projection and dimple, said stay is separated from said base.

3. An inside rearview mirror assembly according to claim 1, wherein said holder means comprises an element mounted on said stay and adjustable positionally with respect to the stay, a holder member supported on said base and holding said element detachably thereon, and a spacer disposed between said holder member and said stay for keeping said holder member and said stay spaced a constant distance from each other.

4. An inside rearview mirror assembly according to claim 3, wherein said spacer comprises a resilient member.

5. An inside rearview mirror assembly according to claim 3, wherein said holder member comprises a resilient member.

6. An inside rearview mirror assembly for use in the passenger compartment of a motor vehicle, comprising:

a base adapted to be mounted in the passenger compartment and attached to a body of the motor vehicle;

a mirror;

a stay supporting said mirror;

holder means holding said stay detachably with respect to said base; and said base and said stay having respective joint surfaces intimately contacting each other, partly spherical interfitting projection and dimple formed respectively on front ends of said joint surfaces with respect to a longitudinal direction of the motor vehicle, and non-contact surfaces disposed forwardly of said projection and dimple with respect to said longitudinal direction and providing a gap between said stay and said base, wherein said holder means comprises an element mounted on said stay and adjustably positionable with respect to the stay and a holder member supported on said base and detachably holding said element thereon.

7. An inside rearview mirror assembly according to claim 6, wherein said base has a first support portion supporting more than half of said holder member, and said stay has a second support portion supporting at least a portion of the remainder of said holder member on said non-contact surface thereof.

8. An inside rearview mirror assembly according to claim 7, wherein said holder member comprises a substantially annular body and a plurality of teeth projecting radially inwardly from said body into engagement with said element, said body having an outer periphery thereof, more than half of which is supported by said first support portion of said base.

9. An inside rearview mirror assembly according to claim 8, wherein said holder member has a stiffening rib along the outer periphery of said body.

10. An inside rearview mirror assembly according to claim 8, wherein said second support portion comprises a pair of support protrusions on said stay, said holder member further having a positioning leg extending from said body and positioned between said support protrusions.

* * * * *